United States Patent
Abraham

(10) Patent No.: US 8,133,033 B2
(45) Date of Patent: Mar. 13, 2012

(54) HIGH VOLTAGE BUS CAPACITOR PRE-CHARGER CIRCUIT

(75) Inventor: Claude Abraham, Stow, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 804 days.

(21) Appl. No.: 12/261,455

(22) Filed: Oct. 30, 2008

(65) Prior Publication Data
US 2010/0111706 A1 May 6, 2010

(51) Int. Cl.
F04B 49/06 (2006.01)

(52) U.S. Cl. ............ 417/45; 417/12; 417/42; 417/44.1; 417/44.11; 318/66; 318/71; 318/98

(58) Field of Classification Search ............ 417/12, 417/42, 44.1, 44.11, 45; 318/66, 71, 98
See application file for complete search history.

(56) References Cited

U.S. PATENT DOCUMENTS

| | | | | |
|---|---|---|---|---|
| 5,528,120 A * | 6/1996 | Brodetsky | | 318/785 |
| 5,710,494 A * | 1/1998 | Paweletz | | 318/366 |
| 6,834,737 B2 * | 12/2004 | Bloxham | | 180/165 |
| 6,963,796 B2 * | 11/2005 | Larson et al. | | 701/36 |
| 7,042,180 B2 * | 5/2006 | Terry et al. | | 318/400.21 |
| 7,230,395 B2 * | 6/2007 | Horii | | 318/139 |
| 7,459,869 B2 * | 12/2008 | Park | | 318/124 |
| 2002/0074175 A1 * | 6/2002 | Bloxham | | 180/165 |
| 2005/0065684 A1 * | 3/2005 | Larson et al. | | 701/36 |
| 2005/0068000 A1 * | 3/2005 | Yamada et al. | | 318/802 |
| 2005/0068001 A1 * | 3/2005 | Skaug et al. | | 318/807 |
| 2005/0225270 A1 * | 10/2005 | Schnetzka et al. | | 318/66 |
| 2006/0220601 A1 * | 10/2006 | Horii | | 318/139 |
| 2007/0014134 A1 * | 1/2007 | Shih | | 363/52 |
| 2008/0104983 A1 * | 5/2008 | Yamai et al. | | 62/228.1 |
| 2008/0211449 A1 * | 9/2008 | Yamai et al. | | 318/767 |
| 2008/0238349 A1 * | 10/2008 | Cheng | | 318/400.05 |
| 2009/0206778 A1 * | 8/2009 | Roh et al. | | 318/127 |

FOREIGN PATENT DOCUMENTS

EP 1880904 A1 1/2008

* cited by examiner

Primary Examiner — Nimeshkumar Patel
Assistant Examiner — Thomas A Hollweg
(74) Attorney, Agent, or Firm — Fay Sharpe LLP

(57) ABSTRACT

A precharge circuit (20, 20', 20") charges at least one capacitor (22, 22', 22") associated with an electrical device with high capacitance, such as a motor (14) which drives a compressor (16) of the pneumatic system. One end of the at least one capacitor is connected with a high voltage bus (10). The other end of the at least one capacitor is connected by at least one charge limiting resistor (24, 24', 24") with a low reference node. When the at least one capacitor is charged at least to a preselected level, a control circuit (28, 28', 28") controls a switch (26, 26', 26") to bypass the current limiting resistor. In this manner, the current limiting resistors limit the surge current to charge the capacitors. Once the capacitors are charged, the resistors and their associated heat dissipation are removed from the circuit and only ripple current from across the capacitors flows through the switch reducing a required current carrying capacity and needed heat sinking for the switch.

13 Claims, 2 Drawing Sheets

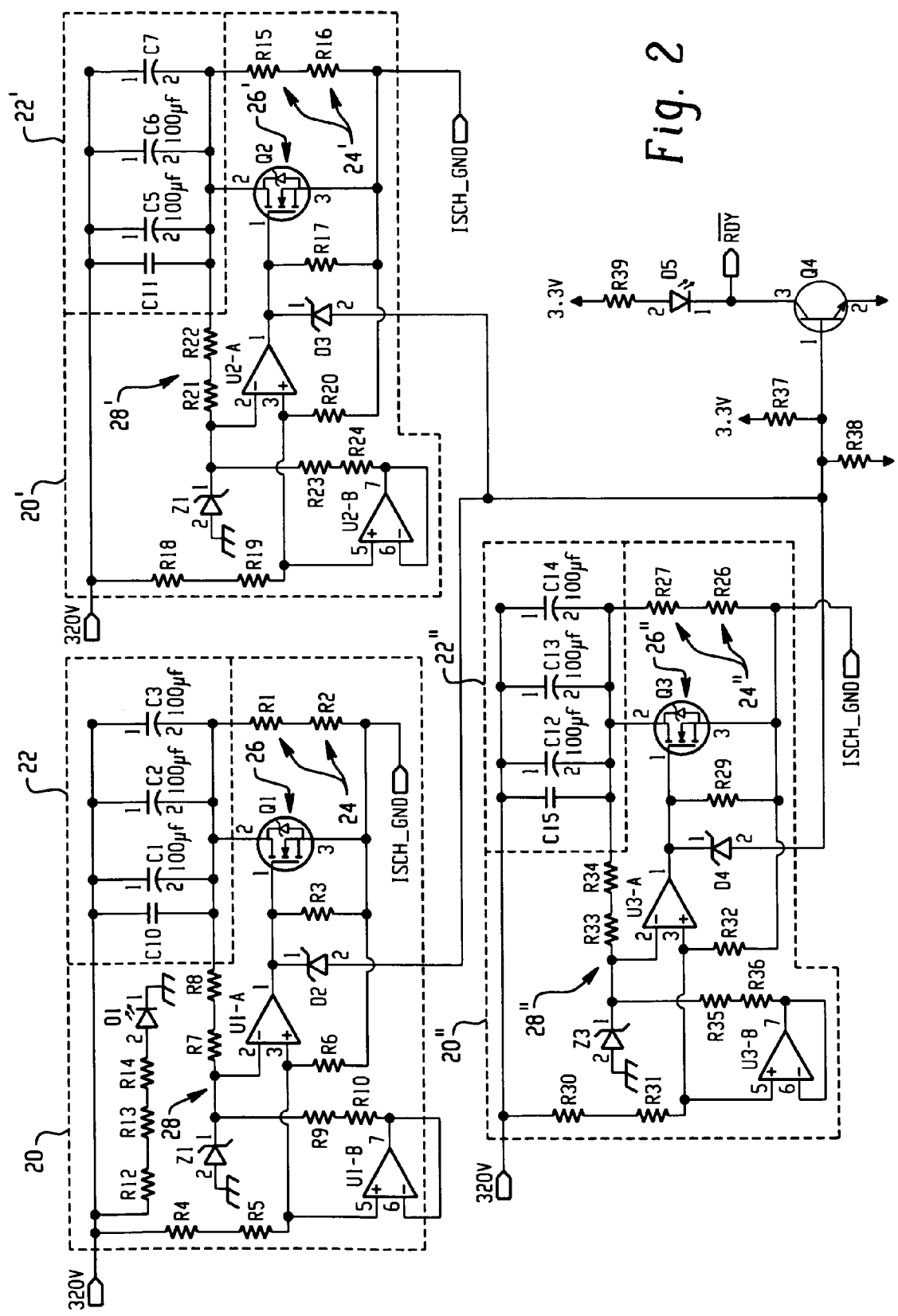

HIGH VOLTAGE BUS CAPACITOR PRE-CHARGER CIRCUIT

BACKGROUND

The present application finds particular application in conjunction with hybrid commercial vehicles and will be described with particular reference thereto. It is to be appreciated, however, that it may also find application in conjunction with power supplies for other circuits with high capacitance such as stereo amplifiers, motor controllers, and the like.

Many commercial vehicles include a pneumatic system for controlling brakes and other functions. A compressor cycles on and off to maintain pressure in a pneumatic reservoir within preselected pressure limits. Typically, the compressor is driven directly from the internal combustion engine.

One problem in driving the compressor directly from the internal combustion engine is that the internal combustion engine must be sized sufficiently large not only to propel the vehicle fully loaded, but also to power the compressor and other accessories concurrently. A smaller internal combustion engine can be utilized and fuel saved if the compressor and other accessories are powered electrically rather than directly by the internal combustion engine.

To drive the compressor, a relatively powerful electric motor is needed. To keep the physical size of the motor relatively small, and for other reasons, the power bus of a hybrid vehicle is normally several hundred volts. The motor, typically a three-phase brushless DC type, when turned on, draws a significant current, e.g. on the order of 20 amps. To limit the surge current, others have proposed using resistors and a power switch. However, at currents of this magnitude, the power loss ($I^2R$ where I is current and R is resistance) is substantial. After the capacitors are charged, a switch can be used to bypass the resistors. However, a solid-state switch capable of carrying 20 amps or greater is again problematic.

The present application discloses a capacitor pre-charging circuit suitable for use in hybrid commercial vehicles and other applications with high surge currents at high voltages.

SUMMARY

In accordance with one aspect, an apparatus is provided for maintaining pneumatic pressure for a pneumatic system, the apparatus includes a compressor which provides compressed air to a pneumatic system, a motor which drives the compressor, a speed controller which controls a speed of the motor, and at least one precharge circuit. The precharge circuit charges at least one capacitor associated with the motor and the speed controller. The precharge circuit includes at least one charge limiting resistor disposed between the at least one capacitor and a low reference node, and a switch for selectively bypassing the at least one charge limiting resistor.

In accordance with another aspect, a precharge circuit is provided for precharging a capacitor of an electrical device with high capacitance. One side of the capacitor is connected with a high voltage bus and an opposite side of the capacitor is connected by at least one charge limiting resistor with a low reference node. A switch bypasses the current limiting resistor such that the switch carries ripple current across the capacitor but does not carry a full current between the high bus and the low reference node.

In accordance with another aspect, a method is provided in which a voltage is applied to a high voltage bus causing a surge current as at least one capacitor associated with an electrical device charges. Charging of the capacitor is limited by a charge limiting resistor electrically connected between the capacitor and a low reference node. After the capacitor is charged at least to a preselected level, a switch is closed, bypassing the charge limiting resistor such that ripple current through the capacitor passes through the switch to the low reference node.

One advantage resides in minimizing current surge and gradually charging the capacitors.

Another advantage resides in minimizing a voltage drop and power loss across the power switching devices.

Another advantage resides in relatively small power switching devices and reduced heat sinking.

Another advantage resides in compact size and modest cost.

Still further advantages and benefits will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
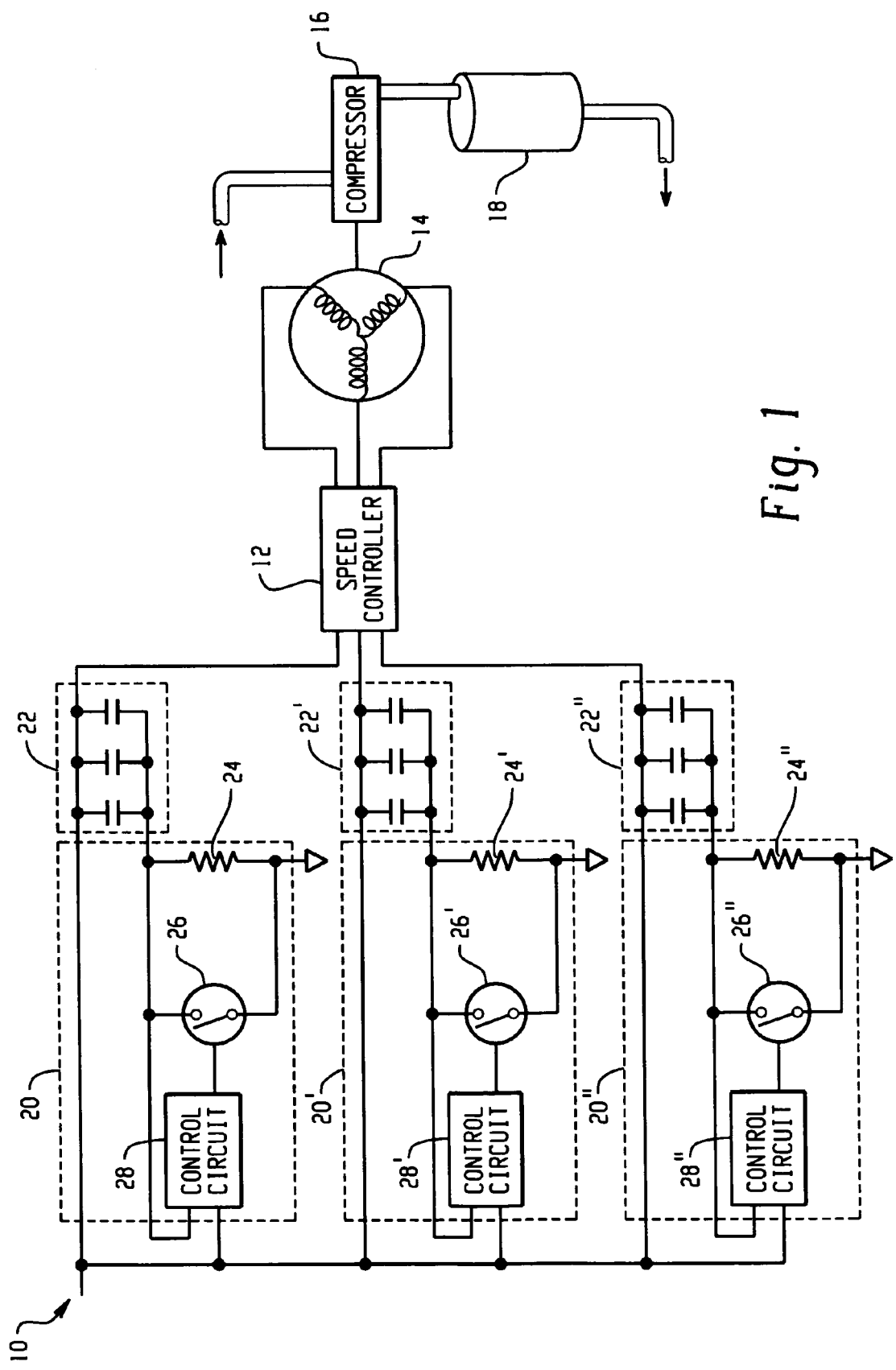
FIG. 1 is a diagrammatic illustration of a pneumatic reservoir pressurizing system including a precharger circuit; and, FIG. 2 is a detailed diagram of the precharging circuit of FIG. 1.

With reference to FIG. 1, a high voltage bus 10, e.g. a 320 volt DC voltage bus, supplies power to a speed controller 12, such as a pulse width modulator, which in turn provides controlled current to a motor 14. The motor 14 drives a compressor 16, such as a screw-type compressor, which pressurizes a pneumatic system reservoir 18. Compressed air from the pneumatic system reservoir 18 is selectively supplied to brakes and other pneumatic systems (not shown). A pressure sensor in the reservoir controls speed controller 12 and a switch upstream on the bus 10 to maintain the air pressure in the reservoir within preselected limits.

In the illustrated embodiment, the motor 14 is a three-phase DC motor. A capacitor precharger circuit 20, 20', 20" precharges capacitors or capacitor banks 22, 22', 22" associated with each of the three windings of the three-phase motor 14. The precharger circuit 20 is described herein in detail and it is to be understood that the description also applies to the precharger circuits 20' and 20" for the other phases.

On powering up, a charging rate of the capacitor bank 22 is limited by a charging current limiting resistor 24. Of course, a plurality of resistors is also contemplated. Note that the capacitor bank 22 is connected directly to the high voltage bus 10 and the charge limiting resistor 24 is connected between the capacitor bank and low reference node. Because the capacitance can be in the range of hundreds to tens of thousands of microfarads (μF), the initial surge current can be substantial. Once the capacitor bank 22 is charged, a switch 26 is closed to bypass the current limiting resistor 24. This effectively removes the resistor 24 from the circuit, eliminating the power loss and heat generation that would occur if the resistor 24 remained in the circuit. It should be noted that by placing the power switch 26 and the charging current limiting resistor 24 between the capacitor bank 22 and the low reference node, less power is dissipated across the switch 26, enabling a smaller power switch to be utilized.

In this location, the switch 26 does not carry the entire high voltage bus current. Rather, only the ripple current of the capacitor bank is carried by the switch.

A switch controller 28 controls the switch 26 to switch it between its conductive and non-conductive modes. In one embodiment, the control circuit 28 includes a comparator. When the comparator determines that the charge voltage on the capacitors has reached a preselected level, e.g., 90% of the high voltage bus potential, the comparator controller 28 closes the switch 26 to bypass the charge limiting resistor 24. In another embodiment, the control circuit 28 includes a timer. The timer times a preselected duration from initial power up, e.g., the precharger/motor/compressor assembly being connected to the high voltage system of the hybrid vehicle, e.g. when air pressure in the pneumatic reservoir 18 falls below a low limit set point. The timed duration is precalculated in order to provide sufficient time to charge the capacitors 22 to the preselected level.

FIG. 2 provides a detailed circuit diagram of the precharger circuit 20, 20', 20", illustrated diagrammatically in FIG. 1. In the illustrative embodiment of FIG. 2, the high voltage bus is 320 VDC nominal with 900 μF of capacitance on the bus. For example, each precharger circuit 20, 20', 20" charges a capacitor bank 22, 22', 22" including three 100 μF capacitors C1, C2, C3; C5, C6, C7; C12, C13, C14. The power switch 26 is illustrated in the form of MOSFETs Q1, Q2, Q3 which are connected to the low side of the corresponding capacitor bank 22, 22', 22". On power up, the surge current limiting resistors 24, 24', 24" illustrated as resistors R1, R2; R15, R16; R27; R28 limit the charging current. Once the capacitor voltage reaches a preset value close to that of the high voltage bus, the power switches 26, 26', 26" is turned on, bypassing the resistor 24, 24', 24". The switch can be a TO-247 body size, leaded through-hole, low resistance MOSFET with low switching losses, such as part FCH47N60F, an N-channel MOSFET manufactured by Fairchild Semiconductor.

The power switch, a MOSFET in this illustration, does not carry the entire high voltage bus current, but only the AC ripple current of the capacitor bank 22, 22', 22". This results in no (or negligible) DC voltage drop in the high voltage bus 10 and the low reference node. Also, the dissipation in the power switch is lower as a result. For example, heat sinking can be provided by the conductive layer of a conventionally printed circuit board rather than a separate component dedicated to providing heat sinking capability. In the illustrated embodiment, the MOSFET can operate in the first and third quadrants. With a positive gate-to-source bias, current is conducted from the drain to the source, when the capacitors are charging (sinking current), which constitutes the first quadrant operation. When the capacitors are discharging (sourcing current), current is conducted from the source to the drain, which constitutes the third quadrant MOSFET operation, commonly employed in synchronous rectification. Alternately, a relay or other switch can provide these switching capabilities.

Looking in detail to the precharge circuit 20, (20', 20") on powering up, MOSFET Q1 (Q2, Q3) is off and resistors R1, R2 (R15, R16; R27, R28) limit the surge current as capacitors C1, C2, C3 (C5, C6, C7; C12, C13, C14) become charged. A charge level indicator network is formed by resistors R4-R10 (R18-R24; R30-R36) and op amps U1-A and U1-B (U2-A; U2-B; U3-A, U3-B) function to indicate the charge level of the capacitors. When the voltage on capacitors C1-C3 (C5-C7; C12-C14) reaches a preset level, e.g., 95% of the bus value, op amp U1-A (U2-A, U3-A) functions as a comparator to drive the MOSFET's gate high, turning Q1 (Q2, Q3) fully on and bypassing the surge resistors R1, R2 (R15, R16; R27, R28). An identical scenario takes place in precharge circuit sections 20', 22'.

When all three sections are charged and the op amps are in their high state, three Schottky diodes D2, D3, D4 are reversed biased. A bipolar junction transistor Q4 is then forward biased and driven to the on state. LED indicator lamp D5 illuminates and a low true ttl level signal $\overline{RDY}$ is outputted at Q4's collector. This conveys to the host controller that the capacitor bank's precharging is complete and the high voltage bus is ready to function.

Using the comparator technique, the MOSFET turns on and bypasses the surge limiting resistors when the capacitor bank reaches 95% of the bus voltage, regardless of the input bus voltage value.

Resistors R12-R14 and LED lamp D1 provide a visual indication that the network is energized.

In one embodiment, the high voltage bus powers a DC motor with a running current around 16 amps. AC ripple current in the capacitor bank is typically below 8 amps. Thus, the MOSFETs carry only up to the 8 amp ripple. Because the conduction losses in the MOSFET varies as the square of the current, the dissipation is ¼ of what it would be if the MOSFET had been placed on the high side of the capacitor bank, as is traditionally done. This results in lower losses and high efficiency, lower MOSFET temperatures, lower temperatures for neighboring parts, high reliability, and less of a need for heat sinking. In this exemplary application, a printed circuit board can provide adequate heat sinking.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An apparatus for maintaining pneumatic pressure for a pneumatic system, the apparatus comprising:
   a compressor (16) which provides compressed air to the pneumatic system;
   a motor (14) which drives the compressor;
   a speed controller (12) which controls a speed of the motor; and
   at least one precharge circuit (20, 20', 20") for charging at least one capacitor (22, 22', 22") associated with the motor (14) and the speed controller (12) with current from a high voltage bus (10), the precharge circuit including:
   at least one charge limiting resistor (24, 24', 24") disposed between the at least one capacitor and a low reference node, and
   a switch (26, 26', 26") for selectively bypassing the at least one charge limiting resistor (24, 24', 24").

2. The apparatus according to claim 1, wherein the precharge circuit further includes:
   a switch control circuit (28, 28', 28") for controlling the switch (26, 26', 26") to open and close.

3. The apparatus according to claim 2, wherein the control circuit (28, 28', 28") includes:
   a comparator which compares a voltage across the at least one capacitor (22, 22', 22") and controls the switch (26, 26', 26") to bypass the charge limiting resistor (24, 24', 24") when the voltage across the capacitor reaches a preselected percentage of the input voltage on the high voltage bus (10).

4. The apparatus according to claim 2, wherein the control circuit (28, 28', 28") includes:
   a timer which controls the switch (26, 26', 26") to close a preselected time after applying power to the high voltage bus (10).

5. The apparatus according to claim 2, wherein the switch (26, 26', 26") includes a MOSFET (Q1, Q2, Q3) sized to carry only a fraction of the current on the high voltage bus (10).

6. The apparatus according to claim 2, wherein the motor (14) includes a three-phase motor and further including at least one precharge circuit which charge capacitors associated with each phase of the three-phase motor.

7. A method of precharging the at least one capacitor (22, 22', 22") of the apparatus according to claim 1, the method comprising:
   on power up, charging the at least one capacitor (22, 22', 22") while limiting charging of the capacitor with the current limiting resistor (24, 24', 24") disposed between the capacitor and a low reference node;
   when the capacitor reaches at least a preselected charge level, bypassing the charge limiting resistor (24, 24', 24") with the switch (26, 26', 26");
   whereby placement of the switch between the capacitor and the low reference node limits current flow through the switch to ripple current.

8. The method according to claim 7, wherein the current flowing through the switch is limited to ripple current and is lower than a charging current for charging the at least one capacitor.

9. A precharge circuit for precharging a capacitor (22, 22', 22") of an electrical device with high capacitance, the precharge circuit comprising: one side of the capacitor (22, 22', 22") connected with a high voltage bus (10); at least one current limiting resistor (24, 24', 24") connected with an opposite side of the capacitor (22, 22', 22") and a low reference node; a switch (26, 26', 26") for bypassing the current limiting resistor, wherein the switch carries ripple current through the capacitor, but does not carry a full current between the high voltage bus and the low reference node, further including: a speed controller (12) connected with the high voltage bus (10); a motor (14) controlled by the speed controller (12); and a compressor driven by the motor (14) which provides compressed air to a pneumatic system.

10. The precharge circuit according to claim 9, further including:
    a switch control circuit (28, 28', 28") for controlling the switch (26, 26', 26") to open and close, the switch control circuit including one of:
        a comparator which compares a voltage across the at least one capacitor (22, 22', 22") and controls the switch (26, 26', 26") to close when the voltage across the capacitor reaches a preselected percentage of the input voltage on the high bus (10), or
        a timer which controls the switch (26, 26', 26") to close a preselected time after applying power to the high voltage bus (10).

11. The precharge circuit according to claim 10, wherein the switch (26, 26', 26") includes a MOSFET sized to carry only a fraction of the current received on the high voltage bus (10).

12. The precharge circuit according to claim 9, further including:
    a device which outputs a ready signal to the controller in response to precharging of the at least one capacitor being complete.

13. A method comprising: applying a voltage to a high voltage bus (10) causing a surge current as capacitors (22, 22', 22") associated with an electrical device (14) charges; limiting charging of the capacitor with a charge limiting resistor (24, 24', 24") electrically connected between the capacitor and a low reference node; after the capacitor is charged at least to a preselected level, closing a switch (26, 26', 26") which bypasses the charge limiting resistor (24, 24', 24") such that ripple current across the capacitor passes through the switch to the low reference node, after bypassing the charge limiting resistor, connecting the high voltage bus with a motor (14) to drive the motor, with the motor (14), driving a compressor (16) to pressurize a pneumatic system pressure reservoir (18).

\* \* \* \* \*